/ Patented Apr. 2, 1935

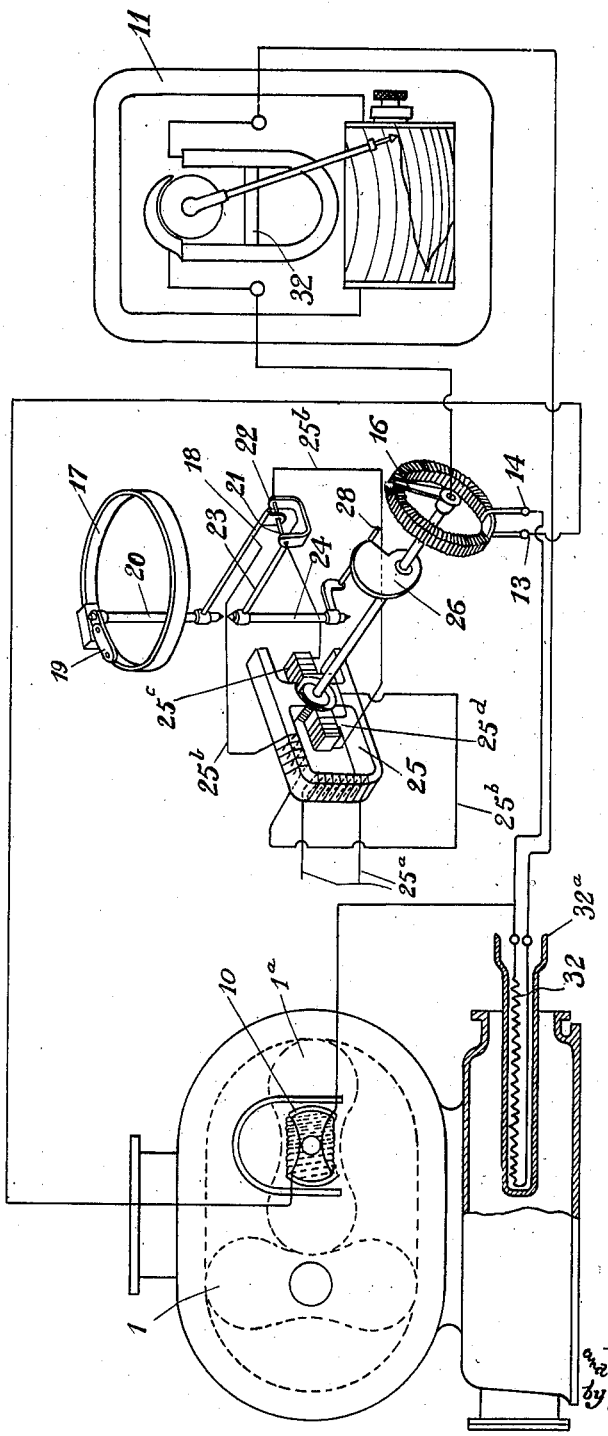

1,996,150

UNITED STATES PATENT OFFICE 1,996,150

FLUID METER

Pierre Georges Eches, Chatillon, and Charles André Moreau, Montrouge, France, assignors to Compagnie pour la Fabrication des Compteurs et Materiel d'Usines a Gaz, Montrouge, Seine, France, a joint-stock company of France Application July 18, 1932, Serial No. 623,214
In France July 24, 1931

2 Claims. (Cl. 73—37)

The present invention has reference to a fluid meter of the positive flow type.

In a general way, meters of the positive flow type for measuring fluids indicate the total quantity of fluid which is passed through the meter, but it is often desirable to know likewise the variations in the instantaneous delivery as a function of time. Furthermore, when measuring the volume of gaseous fluids, the recorded volumes, in order to be comparable amongst themselves, must be reduced to a predetermined pressure and temperature.

One object of the present invention is to enable the variations in the instantaneous delivery to be read off and recorded and also if necessary to transmit such readings to a distant point.

Another object of the present invention is to enable pressure and temperature corrections to be effected automatically in the case of the measurement of gaseous fluids.

The invention as described hereinafter in the case of a positive flow meter of the Roots type applies to all positive flow meters.

The single figure of the accompanying drawing illustrates a device according to the invention for measuring the instantaneous delivery of a fluid meter of the positive flow type.

The positive flow meter illustrated in the figure, includes two rotors or rotatable pistons 1 and 1ª of the Roots type. With this meter is associated a direct current magneto 10 which is rotated directly or through the medium of a gear train by one of the rotors 1 or 1ª of the meter.

The potential difference at the terminals of the magneto 10 is proportional to the speed of rotation of the meter, that is to say, to the instantaneous flow of fluid therethrough. Thus, it is only necessary to connect across the terminals of the magneto a recording voltmeter 11 which will register the variations in the instantaneous delivery.

In the case in which several meters are mounted in parallel to measure a certain volume by providing each apparatus with a magneto in the manner previously described, the recording voltmeter may be so mounted that it measures the potential difference of the group of magnetos mounted in series and thus totalizes the instantaneous deliveries.

With this apparatus it is possible, when measuring a gaseous fluid, to automatically correct the volume measured for predetermined pressure and temperature. With a view to effecting this correction, the terminals of the magneto 10 (or the outer terminals of the magnetos mounted in series) are connected to the ends of a potentiometer 13—14. The recording voltmeter 11 is then no longer connected to the terminals of the magneto 10 but to a cursor 16, the position of which is controlled in a manner presently to be described by a pressure responsive device, such device measuring at each instant the pressure of the gaseous fluid.

As the variations of volume are a linear function of the pressure, it follows that the resistance of the potentiometer being uniform throughout its length, the indications of the voltmeter 11 follow a line law and are functional of the displacement of the cursor 16 consequently, according to the same law, are functional of the pressure.

The pressure responsive device control of the cursor 16 has been illustrated in the drawing. In the device illustrated, the pressure is transmitted either to a movable bell-jar or to a diaphragm in the case of a low pressure, or to a spiral 17 in the case of pressures ranging from 500 grs. to several kilogrammes per square centimeter. Said spiral 17 rotates a movable arm 18 through a link 19 mounted on a spindle 20 on which said arm 18 is likewise mounted. The end of said movable arm 18 can oscillate between two contacts 21 and 22 supported by an arm 23 rotating with a spindle 24 in line with the spindle 20 and rotated by an electric servomotor 25.

The motor 25 is of the rotating field type without slip rings or collector, and it rotates the cursor 16 of the correcting potentiometer 13—14 and also a cam 26 which rotates with said cursor 16. The motor 25 is reversible, the arm 18 and associated contacts 21 and 22 constituting the reversing means therefor. The drawing likewise shows the wiring diagram of the servo-motor 25, the principal circuit 25ª of which may be fed from the mains. The secondary circuit 25ᵇ is connected in series with one of the coils 25ᶜ and 25ᵈ only when the corresponding contact 21 or 22 is closed. It will thus be understood that through the action of the double contact the motor 25 rotates the cam 26 until the arm 23 is parallel with the arm 18 pertaining to the pressure responsive device. The cam 26 controls the rotation of the group of contacts 21 and 22 through the medium of a finger 28. The rotation of the arms 18 and 23 may be determined in advance according to a given law and in the present instance, it is such that the displacement of the cursor 16 over the potentiometer is proportional to the pressure measured by the pressure responsive device. Hence, there is an increase of voltage across the terminals of the voltmeter 11 proportional to the pressure whereby the indications of instantaneous flow are corrected as a function of the pressure.

The drawing also shows an additional resistance 32 mounted in series with the frame of the voltmeter for correcting the indications of instantaneous flow as a function of the temperature.

Said additional resistance 32 is located in a pyrometric stick 32$^a$ which takes the temperature of the gas at the inlet or the outlet of the meter. The expression "pyrometric stick" is used to define a tube or protecting sheath in which is housed the aforesaid electric resistance. It is sufficient to determine said resistance in such manner that the temperature coefficient of increase of resistance of the total resistance of the circuit including the resistance of the frame of the voltmeter and of the armature of the magneto shall be $\alpha=1/273$ which is the coefficient of gaseous expansion. If this condition be observed, the readings of the voltmeter will thus be automatically corrected by the necessary amount to reduce the meter readings to a predetermined temperature, 0° C. or 15° C. for example.

If the resistance of the magneto armature be $R_1$, the resistance of the movable frame of the voltmeter $R_2$ and the resistance of the pyrometric stick $R_3$, the resistance $R_3$ of the pyrometric stick is given by the following equation:

$$R_1+R_2+R_3\times(1+\beta t)=(R_1+R_2+R_3)\times(1+\gamma t)$$

$\gamma$ being equal to 1/273, the temperature coefficient of expansion of gases and $\beta$ designating the coefficient of increase of the pyrometric resistance as a function of temperature.

In practice, $R_3$ may be taken to be a resistance whose temperature coefficient lies between 1/150 and 1/200.

The group of resistances $R_1$ and $R_2$ may be rendered independent of the surrounding temperature by fitting to the voltmeter 11 a magnetic shunt 33 made of a special nickel steel, the object of which is to decrease the stray flux when the temperature increases. This causes a corresponding increase in the magnetic flux acting on the movable frame of the voltmeter and compensates the decrease in sensitivity due to the increase of the resistances $R_1$ and $R_2$ with the temperature.

It is obvious that the voltmeter hereinbefore described might be replaced by a volt-hour meter which would totalize the flow as a function of pressure.

I claim:

1. In a device for measuring the instantaneous delivery of a fluid meter of the positive flow type, the combination of a direct current magneto adapted to be rotated by the rotor of said meter and thus create a voltage proportional to the speed of rotation of said meter, a potentiometer connected across the terminals of said magneto, means for tapping from said potentiometer a voltage corrected for pressure variations, indicator means to which said corrected voltage is applied, an additional resistance mounted in series with said voltage indicator means across said tapped potentiometer potential, and a pyrometric cane accommodating said resistance the value of which is such that the temperature coefficient of increase of the total resistance of the circuit comprising the magneto winding, the resistance of said voltage indicator means and said additional resistance shall be equal to the temperature coefficient of expansion of gases.

2. In a device for measuring the instantaneous delivery of a fluid meter of the positive flow type, the combination of a direct current magneto adapted to be rotated by the rotor of said meter and thus create a voltage proportional to the speed of rotation of said meter, a potentiometer connected across the terminals of said magneto, a cursor displaceable along said potentiometer to tap voltage therefrom, a servo-motor for controlling the displacement of said cursor, means responsive to pressure variations for controlling the operation of said servo-motor, indicator means across which the pressure corrected voltage tapped from said potentiometer is applied, an additional resistance mounted in series with said voltage indicator means across said tapped potentiometer potential, and a pyrometric cane accommodating said resistance the value of which is such that the temperature coefficient of increase of the total resistance of the circuit comprising the magneto winding, the resistance of said voltage indicator means and said additional resistance shall be equal to the temperature coefficient of expansion of gases.

PIERRE GEORGES ECHES.
CHARLES ANDRÉ MOREAU.